United States Patent
Kurono et al.

(10) Patent No.: US 9,575,170 B2
(45) Date of Patent: Feb. 21, 2017

(54) RADAR DEVICE AND TARGET HEIGHT CALCULATION METHOD

(71) Applicants: FUJITSU TEN LIMITED, Kobe-shi, Hyogo (JP); FUJITSU LIMITED, Kawasaki-shi, Kanagawa (JP)

(72) Inventors: Yasuhiro Kurono, Kobe (JP); Kazuo Shirakawa, Yokohama (JP); Yoji Ohashi, Fucyu (JP)

(73) Assignees: FUJITSU TEN LIMITED, Kobe-shi (JP); FUJITSU LIMITED, Kawasaki-shi (JP)

( * ) Notice: Subject to any disclaimer, the term of this patent is extended or adjusted under 35 U.S.C. 154(b) by 521 days.

(21) Appl. No.: 14/016,730

(22) Filed: Sep. 3, 2013

(65) Prior Publication Data

US 2014/0062762 A1 Mar. 6, 2014

(30) Foreign Application Priority Data

Sep. 4, 2012 (JP) .................. 2012-194537

(51) Int. Cl.
*G01S 13/93* (2006.01)
*G01S 13/88* (2006.01)
(Continued)

(52) U.S. Cl.
CPC .............. *G01S 13/88* (2013.01); *G01S 7/354* (2013.01); *G01S 7/4026* (2013.01); *G01S 13/42* (2013.01);
(Continued)

(58) Field of Classification Search
CPC ............. G01S 13/931; G01S 2013/462; G01S 2013/9375; G01S 13/88
(Continued)

(56) References Cited

U.S. PATENT DOCUMENTS 6,377,205 B1 4/2002 Eckersten et al.
6,404,328 B1 * 6/2002 Alland .................. G01S 7/411
340/435

(Continued)

FOREIGN PATENT DOCUMENTS

JP  A-2002-243824    8/2002
JP  2005-221468 A    8/2005
(Continued)

OTHER PUBLICATIONS

May 31, 2016 Office Action issued in Japanese Patent Application No. 2012-194537.

(Continued)

*Primary Examiner* — Marcus Windrich
(74) *Attorney, Agent, or Firm* — Oliff PLC

(57) ABSTRACT

In an in-vehicle radar device, as a vertical azimuth which is an azimuth of a target in a direction perpendicular to a ground surface, a real image vertical azimuth which is an azimuth of a real image existing above ground is calculated from a reflected wave generated when a transmission signal transmitted from a transmission antenna is reflected from the target, and a virtual image vertical azimuth which is an azimuth of a virtual image existing underground is calculated from a reflected wave generated when the transmission signal transmitted from the transmission antenna is reflected from the target and reflected again from the ground surface. Next, in the in-vehicle radar device, an angle difference between the real image vertical azimuth and the virtual image vertical azimuth is calculated, and a height of the target from the ground surface is calculated using the calculated angle difference.

5 Claims, 17 Drawing Sheets

(51) Int. Cl.
*G01S 7/35* (2006.01)
*G01S 7/40* (2006.01)
*G01S 13/42* (2006.01)
G01S 13/58 (2006.01)
G01S 13/46 (2006.01)

(52) U.S. Cl.
CPC ........... *G01S 13/931* (2013.01); *G01S 13/584* (2013.01); *G01S 2007/4034* (2013.01); *G01S 2007/4091* (2013.01); *G01S 2013/462* (2013.01); *G01S 2013/9364* (2013.01); *G01S 2013/9367* (2013.01); *G01S 2013/9375* (2013.01); *G01S 2013/9378* (2013.01)

(58) Field of Classification Search
USPC .................................................... 342/70, 140
See application file for complete search history.

(56) References Cited

U.S. PATENT DOCUMENTS

| | | | | |
|---|---|---|---|---|
| 9,041,588 B2* | 5/2015 | Yasugi | .................. | G01S 13/867 342/189 |
| 2003/0076255 A1* | 4/2003 | Ono | ........................ | G01S 13/34 342/70 |
| 2005/0024261 A1* | 2/2005 | Fujita | .................... | G01S 7/4026 342/174 |
| 2006/0044177 A1 | 3/2006 | Wittenberg et al. | | |
| 2007/0273576 A1* | 11/2007 | Struckman | .............. | G01S 3/146 342/156 |
| 2011/0221628 A1* | 9/2011 | Kamo | .................... | G01S 7/295 342/70 |
| 2012/0119937 A1* | 5/2012 | Yamada | ................ | G01S 7/4021 342/70 |
| 2013/0038484 A1* | 2/2013 | Ohkado | ................ | G01S 13/345 342/70 |

FOREIGN PATENT DOCUMENTS

| | | |
|---|---|---|
| JP | 2006-064628 A | 3/2006 |
| JP | 2008-122391 A | 5/2008 |
| JP | 2010-175471 A | 8/2010 |
| JP | 2010-210483 A | 9/2010 |
| JP | 2011-017634 A | 1/2011 |
| JP | 2011-027695 A | 2/2011 |
| JP | 2012-098107 A | 5/2012 |

OTHER PUBLICATIONS

Jan. 4, 2017 Office Action issued in Japanese Patent Application No. 2012-194537.

* cited by examiner

FIG.2
<CONFIGURATION EXAMPLE 1>
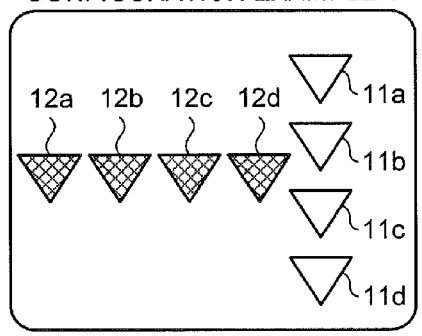
<CONFIGURATION EXAMPLE 2>
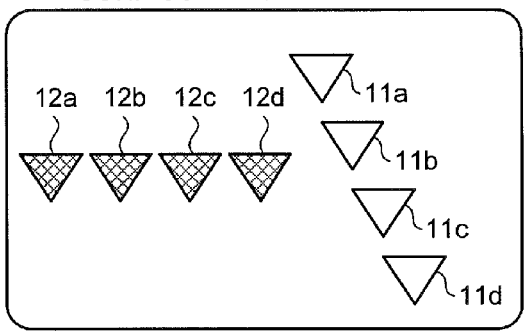

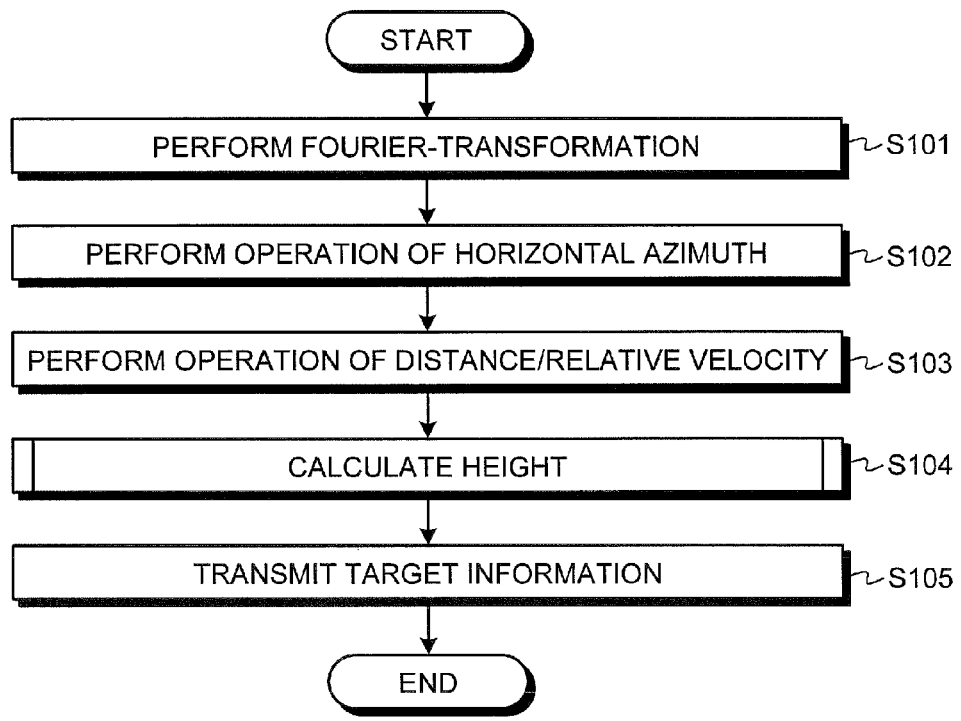
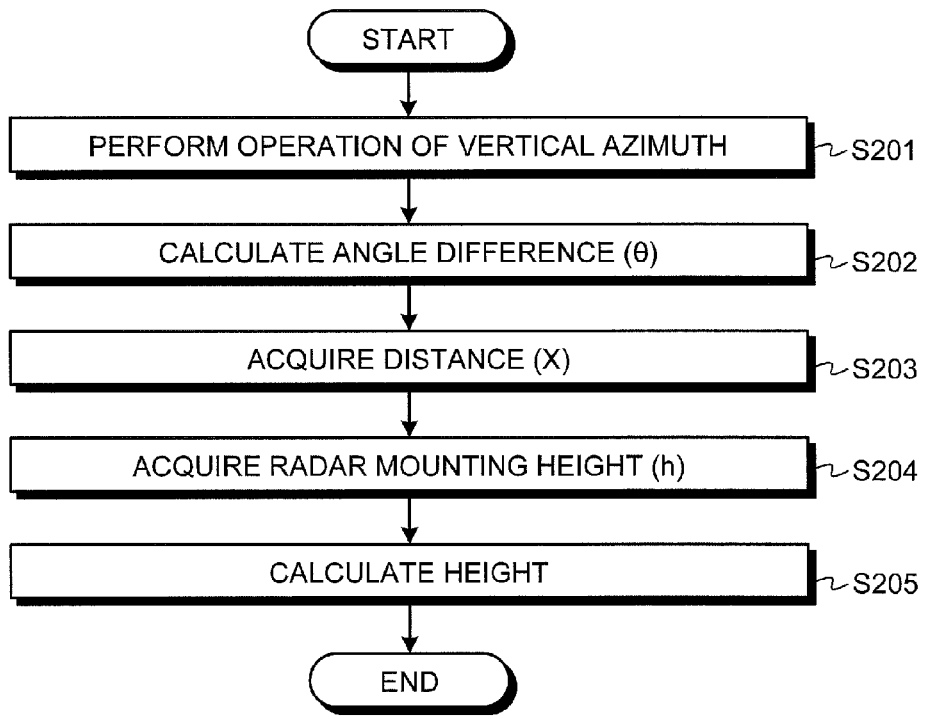

RADAR DEVICE AND TARGET HEIGHT CALCULATION METHOD

CROSS-REFERENCE TO RELATED APPLICATIONS

This application is based upon and claims the benefit of priority of the prior Japanese Patent Application No. 2012-194537, filed on Sep. 4, 2012, the entire contents of which are incorporated herein by reference.

BACKGROUND OF THE INVENTION

1. Field of the Invention

The present invention relates to a radar device and a target height calculation method.

2. Description of the Related Art

Conventionally, an in-vehicle radar is designed mainly on the premise that systems, such as ACC (Adaptive Cruise Control) or PCS (Pre-Collision System) are used. A detection target of the system is a target at risk of a collision. However, since an in-vehicle radar which is currently available does not have a function of calculating a vertical azimuth, the height of the target from the ground surface cannot be grasped. In such a radar, as illustrated in FIGS. 22A and 22B, when a signboard, a fallen object, or the like on a roadway is detected, the detected object is erroneously recognized as a front target, so that the ACC and PCS may accidentally operate.

For this reason, as a method of recognizing a front target without falsely detecting the signboard or fallen object on the roadway as a running vehicle on a roadway, method of squeezing a vertical beam or a method of detecting change in electric power by multipass detection can be considered.

However, in the method of squeezing a vertical beam and the method of detecting change in electric power by multipass detection, there was a problem that it was difficult to appropriately recognize only a front target without falsely detecting a signboard or a fallen object on a roadway as an inappropriate target as described above.

Specifically, as for the method of squeezing a vertical beam, since a highly reflective target such as a big signboard is detected and thus it is falsely recognized as a front target even a vertical beam is squeezed, this method cannot appropriately recognize only a front target. In the method of squeezing a vertical beam at an inclined place such as a slop way, since there is a case where it becomes impossible to detect a front target, a front target cannot be appropriately recognized.

On the other hand, in the method of detecting change in electric power by multipass detection, since it is difficult to fully grasp the behavior of change in electric power by the multipass detection even based on the assumption of specular reflection when a target within a short distance is accidently detected, it is difficult to appropriately determine whether the target is a signboard or a fallen object on a roadway, or not. In the method of detecting change in electric power by the multipass detection, a false decision may be made in case of a target having a complicated shape because a true reflection point is unknown, so that a front target cannot be appropriately recognized.

SUMMARY OF THE INVENTION

It is an object of the present invention to at least partially solve the problems in the conventional technology.

According to one aspect of an embodiment of the present invention, a radar device includes: a vertical azimuth calculation unit which calculates, as a vertical azimuth which is an azimuth of a target in a direction perpendicular to a ground surface, an azimuth of a real image existing above ground from a reflected wave generated when a transmission signal transmitted from a transmission antenna is reflected from the target, and an azimuth of a virtual image imaginarily existing underground using a reflected wave generated when the transmission signal transmitted from the transmission antenna is reflected from the target and reflected again from the ground surface; an angle difference calculation unit which calculates an angle difference between the azimuth of the real image and the azimuth of the virtual image which are calculated by the vertical azimuth calculation unit; and a height calculation unit which calculates a height of the target from the ground surface, using the angle difference calculated by the angle difference calculation unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a diagram illustrating an example of the configuration of an antenna;

FIG. 10 is a flowchart illustrating the whole processing procedure performed by an in-vehicle radar device;

FIG. 11 is a flowchart illustrating the processing procedure of a height calculation process performed by the in-vehicle radar device;

DETAILED DESCRIPTION

Figure 1:
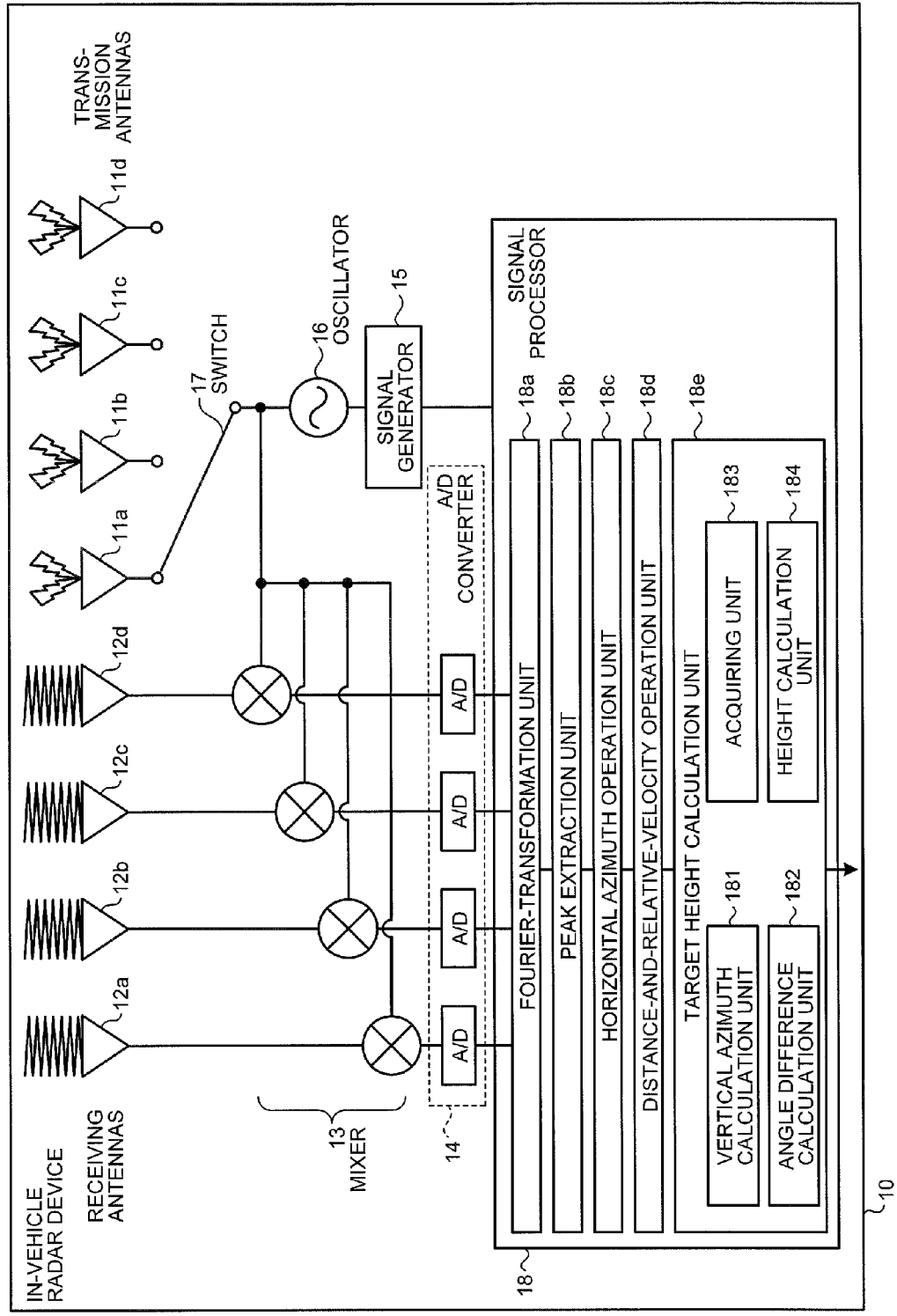
FIG. 1 is a diagram illustrating the configuration of an in-vehicle radar device.

First, the configuration of an in-vehicle radar device 10 is described with reference to FIG. 1. FIG. 1 is a diagram illustrating the configuration of an in-vehicle radar device. Although the in-vehicle radar device 10 is connected to an ECU (Electronic Control Unit) for vehicle control and performs transmission and reception of information with the ECUs for vehicle control, the ECU for vehicle control is not illustrated in the drawings. The connection illustrated in FIG. 1 is an electrical connection.

As illustrated in FIG. 1, the in-vehicle radar device 10 includes a plurality of transmission antennas 11a to 11d, a plurality of receiving antennas 12a to 12d, a mixer 13, an A/D converter 14, a signal generator 15, an oscillator 16, a switch 17, and a signal processor 18.

The transmission antennas 11a to 11d are arranged to be shifted from each other in a vertical direction, and transmit a millimeter wave which has been input from the switch 17, individually. The receiving antennas 12a to 12d are arranged to be shifted in a horizontal direction, and receive a reflected wave, individually.

Here, an example of the configuration of the antenna is described with reference to FIG. 2. FIG. 2 is a diagram illustrating an example of the configuration of the antenna. As illustrated as a configuration example 1 in FIG. 2, the transmission antennas 11a to 11d are arranged to be shifted in a vertical direction, and the receiving antennas 12a to 12d are arranged to be shifted in a horizontal direction. As illustrated as a configuration example 2 in FIG. 2, the transmission antennas 11a to 11d may be arranged to be obliquely shifted in the vertical direction. Thus, with the arrangement in which the transmission antennas 11a to 11d are shifted in the vertical direction, the vertical azimuth of the target can be calculated using a suitable angle estimation method; and with the arrangement in which the receiving antennas 12a to 12d are shifted in the horizontal direction, the horizontal azimuth of the target can be calculated using a suitable angle estimation method. That is, with these transmission antennas 11a to 11d and receiving antennas 12a to 12d, the azimuths of the vertical and horizontal directions can be simultaneously calculated without considerably changing the configuration of a radar at a comparatively low cost. As for the calculation method of calculating the vertical azimuth, it is described in full detail in conjunction with the signal processor 18.

The mixer 13 demodulates a reflection signal received by the receiving antennas 12a to 12d using a detection signal (having a frequency of millimeters) transmitted by the transmission antennas 11a to 11d, and inputs the demodulated reflection signal into the A/D converter 14. The A/D converter 14 converts a demodulated signal input from the mixer 13 into a digital signal and inputs the digital signal into the signal processor 18.

The signal generator 15 generates a signal for modulation (i.e., chopping wave signal) and inputs the signal into the oscillator 16. The oscillator 16 generates, for example, a Frequency Modulated Signal (FMS) having a frequency of millimeters from the signal supplied from the signal generator 15, and inputs the generated signal into the switch 17. The switch 17 inputs the millimeter wave signal which is input from the oscillator 16 into any one of the plurality of transmission antennas 11a to 11d. The switch 17 sequentially switches over the transmission antennas 11a to 11d which receive the millimeter wave signal from the oscillator 16, one after another.

The signal processor 18 includes a Fourier-transformation unit 18a, a peak extraction unit 18b, horizontal azimuth operation unit 18c, a distance-and-relative-velocity operation unit 18d, and a target height calculation unit 18e.

The Fourier-transformation unit 18a is a processor which performs frequency analysis with respect to the digital signal, which is converted by the A/D converter 14, with a DSP (Digital Signal Processor) circuit. Specifically, the Fourier-transformation unit 18a decomposes the digital signal into signal components for every frequency by performing FFT (Fast Fourier Transform) with respect to the digital signal.

The peak extraction unit 18b extracts a frequency corresponding to a signal having power higher than a predetermined threshold among the signal components obtained through the frequency analysis by the Fourier-transformation unit 18a. Hereinafter, this frequency is called peak frequency.

The horizontal azimuth operation unit 18c calculates a horizontal azimuth which is an azimuth of a target in a direction parallel to the ground surface using an existing angle estimation method. Specifically, the horizontal azimuth operation unit 18c calculates the azimuth of each target based on the signal components corresponding to the peak frequencies extracted by the peak extraction unit 18b, and outputs the obtained azimuth to the distance-and-relative-velocity operation unit 18d.

The horizontal azimuth operation unit 18c performs an azimuth operation for a reference object, including a strongly reflective object itself (for example, an object generating the reception signal with high power, which is usually a vehicle, an original detection target of the in-vehicle radar device 10), based on the extraction result of the peak extraction unit 18b. In the azimuth operation of the horizontal azimuth operation unit 18c, although techniques are not limited in particular, preferably it has a high resolution from the view point of the necessity of preferentially detecting the strongly reflective object itself with sufficient accuracy.

Figure 3:
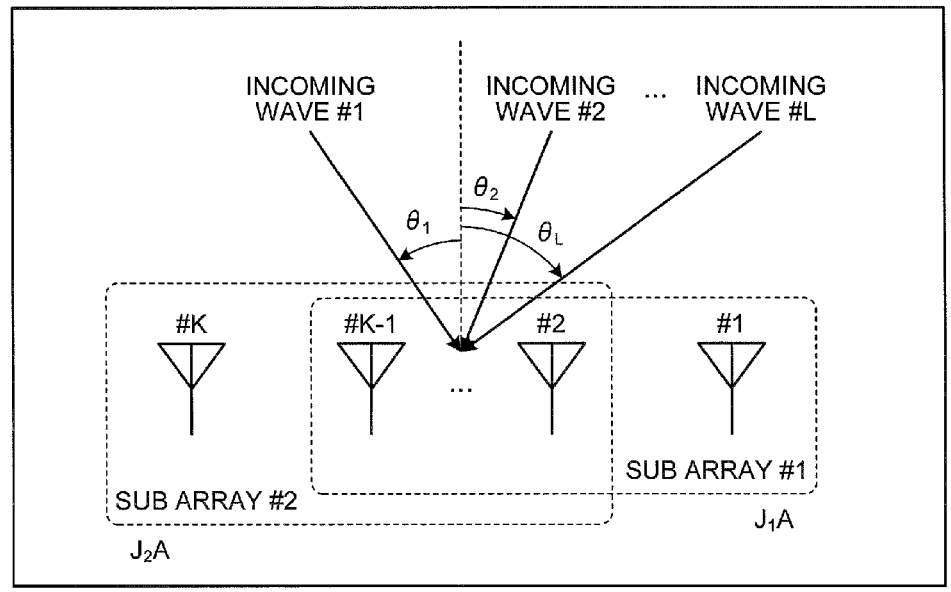
FIG. 3 is a diagram illustrating the outline of ESPRIT.

Then, the horizontal azimuth operation unit 18c performs the azimuth operation using ESPRIT. Here, although it is well known in the art, the ESPRIT is described with reference to FIG. 3. FIG. 3 is a diagram illustrating the outline of the ESPRIT.

The ESPRIT is a technique of dividing the receiving antennas 12a to 12d into two sub arrays which are shifted from each other and estimating an incoming direction of a reflected signal by a target, using a phase difference of radio waves received by the two sub arrays.

As illustrated in FIG. 3, a linear array of K elements is assumed. As illustrated in FIG. 3, the number of incoming waves is set to L and an azimuth of an i-th incoming wave is set to $\theta_i$ (i=1, 2, ..., L).

Here, the ESPRIT estimates a phase rotation of each incoming wave which is caused by parallel movement of the whole array based on a rotation invariant equation "$J_1A\Phi=J_2A$." A matrix $J_1$ and a matrix $J_2$ are a transformation matrix system of order (K−1)×K, A is a direction matrix composed of array response vectors where variables are $\theta_1$ to $\theta_L$, and $\Phi$ is a diagonal matrix of L order in which entries are complex numbers determined based on the incoming direction of each signal.

As illustrated in FIG. 3, in a linear array including K elements, when elements from a first element to a (K−1)-th element are set to a sub array #1 and elements from a second element to a K-th element are set to a sub array #2, $J_1A$ of the rotation invariant equation means an operation of extracting first to (K−1)-th rows of the matrix A, and $J_2A$ means an operation of extracting second to K-th rows of the matrix. That is, as illustrated in FIG. 3, $J_1A$ represents a direction matrix of the sub array #1, and $J_2A$ represents a direction matrix of the sub array #2.

Here, if A is known, an incoming angle of a path can be estimated by obtaining $\Phi$. However, since A should be estimated, $\Phi$ cannot be directly solved. Then, after obtaining a K×K covariance-matrix $R_{xx}$ of a K-th order reception signal vector, a signal subspace matrix $E_s$ composed of eigenvectors corresponding to eigenvalues larger than thermal noise power $\sigma^2$ is obtained by performing eigenvalue decomposition with respect to $R_{xx}$.

The signal subspace matrix $E_s$ and the matrix A can be expressed as $A=E_sT^{-1}$ using an L-th order regular matrix T that uniquely exists between them. Here, $E_s$ is a K×L matrix and T is a regular matrix of L×L. Thus, $(J_1E_s)(T^{-1}\Phi T)=J_2E_s$ can be obtained by substituting $A=E_sT^{-1}$ into the rotational invariant equation. Since $E_s$ is already known, if $T^{-1}\Phi T$ is obtained from this formula and the eigenvalue decomposition is performed, the eigenvalue becomes as a diagonal element of $\Phi$. Therefore, the azimuth of the incoming wave can be estimated from the eigenvalue.

In this way, since the ESPRIT does not need information on the array response vector, calibration of an array antenna becomes unnecessary and a search operation of a peak search etc. in a spectrum also becomes unnecessary.

The distance-and-relative-velocity operation unit 18d calculates a distance to a target and relative velocity. As for a calculation method of the distance to the target, or the relative velocity, since they are well known in the art, a description thereabout is omitted.

The target height calculation unit 18e is a processor which calculates the height of a target from the ground surface, and includes a vertical azimuth calculation unit 181, an angle difference calculation unit 182, an acquiring unit 183, and a height calculation unit 184.

The vertical azimuth calculation unit 181 calculates the azimuth of a real image existing above ground and the azimuth of a virtual image existing underground. Specifically, the vertical azimuth calculation unit 181 calculates the azimuth (i.e. real image vertical azimuth) of a real image existing above ground, from a reflected wave (direct reflected wave) generated when a transmission wave transmitted from the transmission antennas 11a to 11d is reflected from the target. The vertical azimuth calculation unit 181 calculates the azimuth (virtual image vertical azimuth) of the virtual image existing underground from the reflected wave (reflected wave from ground surface) generated when the transmission waves transmitted from the transmission antennas 11a to 11d are reflected from the target and then reflected again from the ground surface.

Although a method of performing transmission by sequentially changing over the transmission antennas 11a to 11d is an effective method for a calculation method of calculating the vertical azimuth in the vertical azimuth calculation unit 181, simultaneous transmission may also be used.

Figure 4:
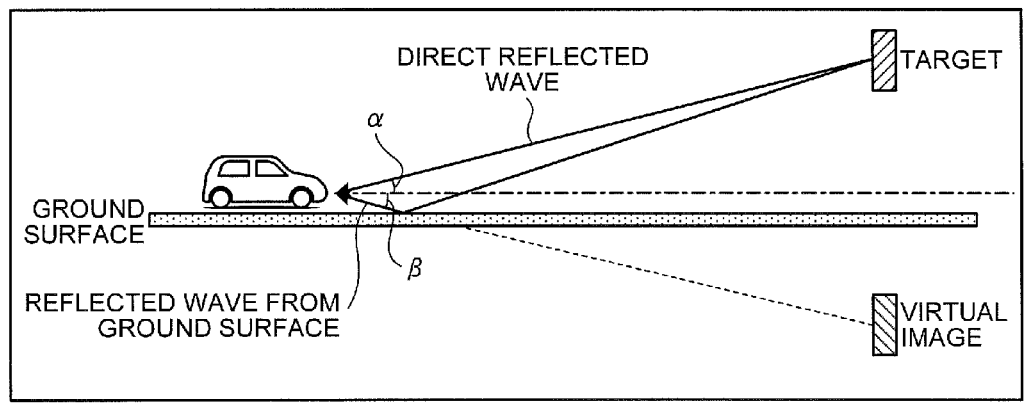
FIG. 4 is a diagram describing a calculation process of calculating a vertical azimuth.

As illustrated in FIG. 4, the vertical azimuth calculation unit 181 calculates a real image vertical azimuth which is a vertical azimuth of the directly reflected wave generated when the transmission wave transmitted from the transmission antennas 11a to 11d is reflected from the target, and a virtual image vertical azimuth which is a vertical azimuth of the reflected wave from ground surface which is generated when the reflected wave which is reflected from the target is reflected again from the ground surface. And the vertical azimuth calculation unit 181 obtains an angle (corresponding to α of FIG. 4) of the real image vertical azimuth, and an angle (corresponding to β of FIG. 4) of the virtual image vertical azimuth. The vertical azimuth calculation unit 181 can calculate the vertical azimuth which is an azimuth of the target in the direction perpendicular to the ground surface by using the known ESPRIT etc. like the horizontal azimuth operation unit 18c.

Figure 5A:
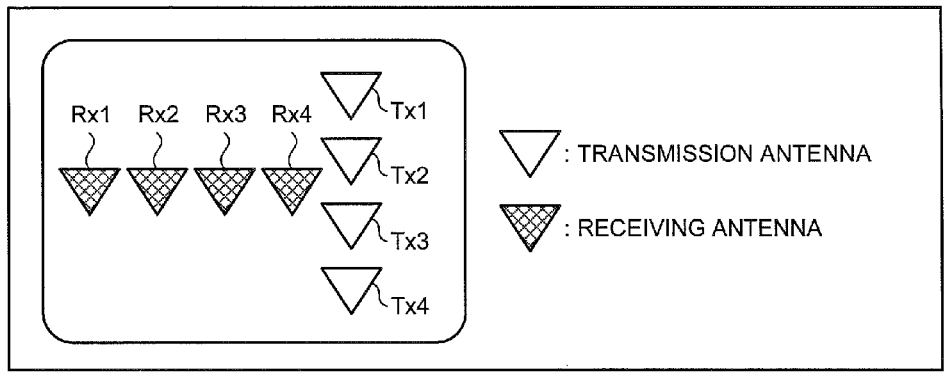
FIGS. 5A, 5B, and 5C are diagrams describing a method of using a reception signal at the time of calculating a horizontal/vertical azimuth.
Figure 5B:
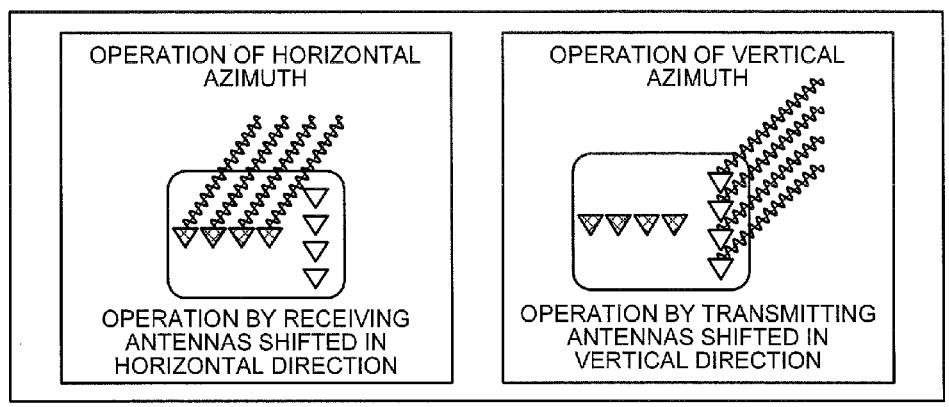
Figure 5C:
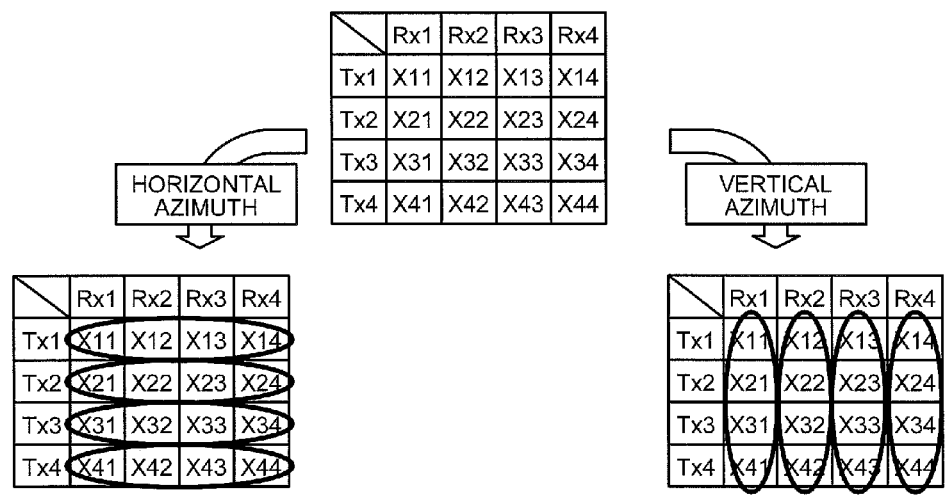

Here, a method of using the reception signal at the time of the horizontal/vertical azimuth calculation is described with reference to FIGS. 5A, 5B, and 5C. FIGS. 5A, 5B, and 5C are diagrams illustrating the method of using the reception signal at the time of the horizontal/vertical azimuth calculation. Here, as illustrated in FIG. 5A, a case where the number of transmission antennas is four and the number of receiving antennas is four is described. Here, the transmission antennas are denoted by Tx1 to Tx4, and the receiving antennas are denoted by Rx1 to Rx4.

As illustrated in FIG. 5B, the horizontal azimuth is calculated by the receiving antennas which are arranged to be shifted in the horizontal direction, and the vertical azimuth is calculated by the transmission antennas which are arranged to be shifted in the vertical direction. In the example of FIG. 5B, since the number of the transmission antennas is four and the number of the receiving antennas is four as described above, there are a total of 16 reception signals.

The 16 reception signals are matched as illustrated in Table of FIG. 5C. And when performing the operation of the horizontal azimuth, the horizontal azimuth operation unit 18c extracts, as the reception signals, four sets of reception signals "X11, X12, X13, X14", "X21, X22, X23, X24", "X31, X32, X33, X34", and "X41, X42, X43, X44", and performs the horizontal azimuth operation using the technique described in conjunction with the horizontal azimuth operation unit 18c. For example, in the azimuth operation using the ESPRIT, the horizontal azimuth of the target is estimated from an average of phase differences calculated from each of the four sets of reception signal vectors "X11, X12, X13, X14", "X21, X22, X23, X24", "X31, X32, X33, X34", and "X41, X42, X43, X44" received by the receiving antennas which are arranged to be shifted in the horizontal direction.

When performing the operation of the vertical azimuth, the vertical azimuth calculation unit 181 extracts, as the reception signals, four sets of reception signals "X11, X21, X31, X41", "X12, X22, X32, X42", "X13, X23, X33, X43", and "X14, X24, X34, X44", and performs the vertical azimuth operation using the same technique as one described in conjunction with the horizontal azimuth operation unit 18c. For example, in the azimuth operation using the ESPRIT, the vertical azimuth of the target is estimated from an average of phase differences calculated from each of the four sets of reception signal vectors "X11, X21, X31, X41", "X12, X22, X32, X42", "X13, X23, X33, X43", and "X14, X24, X34, X44" received by the receiving antennas.

Returning to the description about FIG. 1, the angle difference calculation unit 182 calculates an angle difference of the real image vertical azimuth and the virtual image vertical azimuth which are calculated by the vertical azimuth calculation unit 181. Specifically, when two vertical azimuths exist within the same distance as the azimuth of the target calculated by the vertical azimuth calculation unit 181, the angle difference calculation unit 182 sets an upper azimuth to the real image vertical azimuth and a lower azimuth to the virtual image vertical azimuth, and calculates a difference between the real image vertical azimuth and the virtual image vertical azimuth as an angle difference. Since a multipass does not occur when the target is a fallen object existing above the ground surface, as the azimuth of the target calculated by the vertical azimuth calculation unit 181, only one vertical azimuth exists within the same distance. In this case, in the height calculation unit 184 described below, the height of the target is calculated from the distance, the vertical azimuth, and a radar mounting height, without computing the angle difference. When the height is about 0, the target is determined to be a fallen object. Or when only one vertical azimuth exists in the same distance, the target may be determined to be a fallen object. Here, the virtual image vertical azimuth does not necessarily appear. Since there is no multipass in the case of a fallen object, only a real image appears. In the case of an overhead object, the azimuth of a real image and the azimuth of a virtual image appear.

The acquiring unit 183 acquires the distance from the in-vehicle radar device 10 to the target, which is calculated by the distance-and-relative-velocity operation unit 18d, and acquires the radar mounting height which is the preset height of the in-vehicle radar device 10 from the ground surface.

The height calculation unit 184 calculates the height of the target from the ground surface using the angle difference calculated by the angle difference calculation unit 182. Specifically, the height calculation unit 184 calculates the height (hereinafter, referred to as "target height") of the target from the ground surface by the following Formula (1) using the angle difference calculated by the angle difference calculation unit 182. And the height calculation unit 184 outputs information about the target height to the ECU (not illustrated) for vehicle control which is connected when the distance, relative velocity, the horizontal angle, and the height of the target are calculated.

$$Y = -\frac{X}{\tan\theta} + \sqrt{\frac{X^2}{(\tan\theta)^2} + h^2 + X^2} \tag{1}$$

Figure 6:
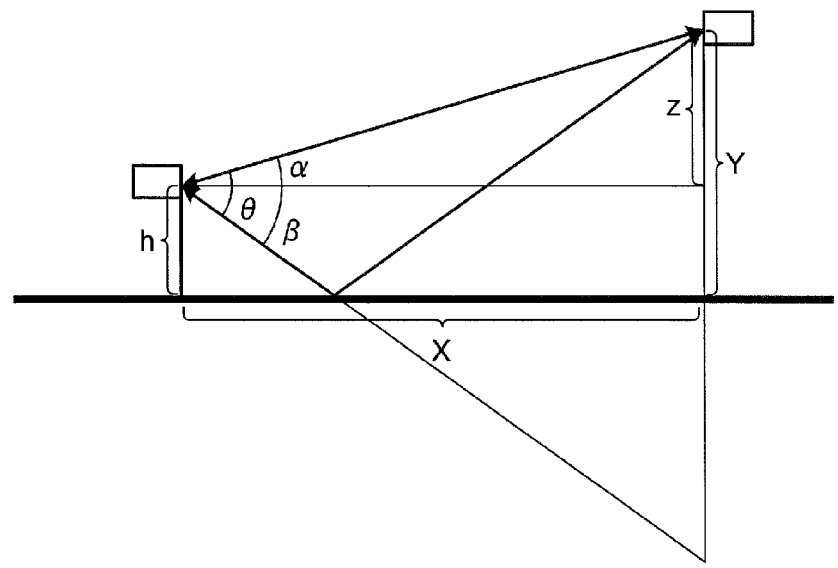
FIG. 6 is a diagram describing a calculation process of a target height.

Here, the formula used for a calculation process of the target height is described using the example of FIG. 6. FIG. 6 is a diagram describing the calculation process of the target height. In the example of FIG. 6, θ is a vertical angle difference calculated by the angle difference calculation unit 182; α is an angle of a real image vertical azimuth; β is an angle of a virtual image vertical azimuth; h is a radar mounting height acquired by the acquiring unit 183; X is a distance to the target acquired by the acquiring unit 183; z is a target height from a radar mounting height; and Y is a target height from a road surface and is a value calculated by the height calculation unit 184.

Even in the circumstance of FIG. 6, if Formula (2) is used, Formula (3) and Formula (4) are obtained.

$$Y = z + h \tag{2}$$

$$\tan\alpha = \frac{z}{X} = \frac{Y-h}{X} \tag{3}$$

$$\tan\beta = \frac{2h+z}{X} = \frac{Y+h}{X} \tag{4}$$

If the formulas are rearranged using Formula (5) which is an additional theorem concerning a trigonometric function, Formula (6) is obtained. And Formula (6) is solved by Y, Formula (7) is obtained.

$$(\tan(\theta) =)\tan(\alpha + \beta) = \frac{\tan\alpha + \tan\beta}{1 - \tan\alpha \tan\beta} \tag{5}$$

$$\tan(\theta) = \frac{\frac{Y-h}{X} + \frac{Y+h}{X}}{1 - \frac{Y-h}{X} \cdot \frac{Y+h}{X}} = \frac{2XY}{X^2 - Y^2 + h^2} \tag{6}$$

$$Y = -\frac{X}{\tan\theta} \pm \sqrt{\frac{X^2}{(\tan\theta)^2} + h^2 + X^2} \tag{7}$$

Here, since the value of the height is a positive value (+), a value with a positive sign "+" among signs "+" and "−" is adopted as the value of the height. The value of the target height is expressed as Formula (1) mentioned above. Thus, since the target height can be appropriately calculated from the angle difference, only a front target can be appropriately recognized, without a false detection of a signboard or a fallen object on a roadway. When the target is a fallen object above the ground, only a real image appears and a virtual image does not appear because there is no multipass. Accordingly, for the azimuth of the target calculated by the vertical azimuth calculation unit 181, there is only one value and thus the angle difference cannot be calculated. Therefore, the height calculation unit 184 calculates the height of the target from the distance, the vertical azimuth, and the radar mounting height. At this time, when the height is nearly 0, the target is determined to be a fallen object. Alternatively, when only one vertical azimuth exists within the same distance, the target may be determined to be a fallen object.

Since the target height is calculated using a vertical angle difference, this method is effective especially when the method of transmitting by sequentially changing over the transmission antennas 11a to 11d is used. That is, when detecting a target with relative velocity, the influence of a transmitting time lag on the calculated value can be suppressed. This is because an azimuth difference is almost constant while the pure azimuth of a target is greatly shifted under the influence of a transmitting time lag which occurs when the signal is transmitted after the transmission antenna is switched.

Figure 7:
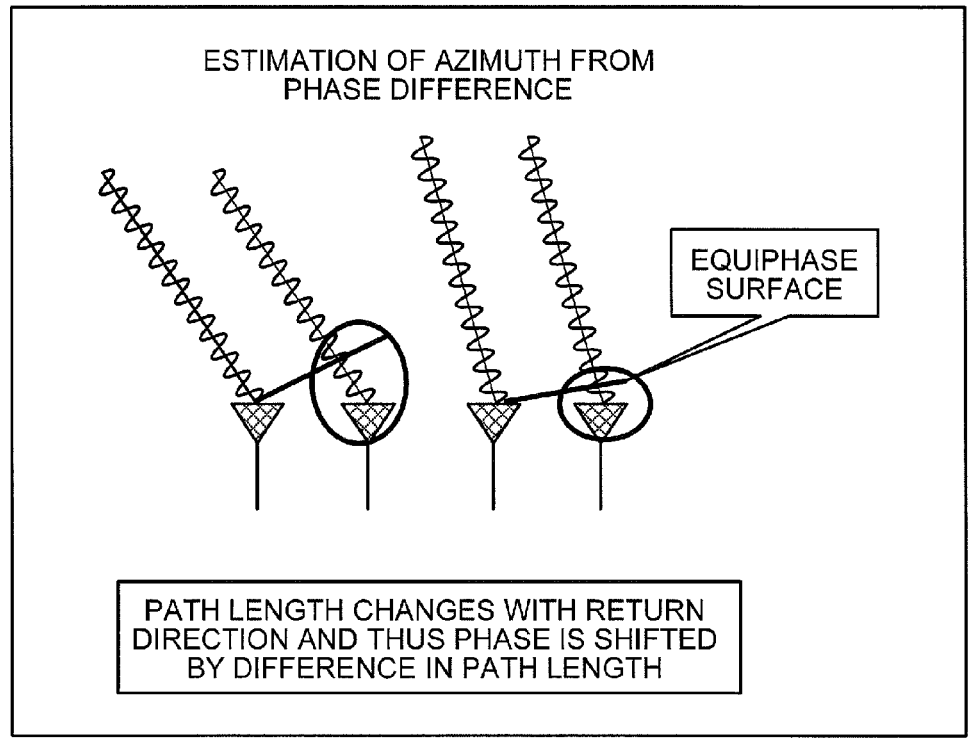
FIG. 7 is a diagram illustrating the reason why an angle is shifted due to a transmitting time lag.

Here, why the angle is shifted by the transmitting time lag in conventional technology is described with reference to FIGS. 7 and 8. As illustrated in FIG. 7, in the azimuth operation, most methods which can especially perform angle separation calculate using the phase difference (propagation path length difference) between radio waves returning to the plurality of receiving antennas. That is, as illustrated in the example of FIG. 7, since the receiving antennas receive radio waves with different path lengths depending on the return directions, a phenomenon that the phase is accordingly shifted by an amount corresponding to the difference in path length is used. Here, since the signals received simultaneously are used when extracting the phase difference with use of the receiving antennas, the phase difference is calculated exactly as designed.

Figure 8:
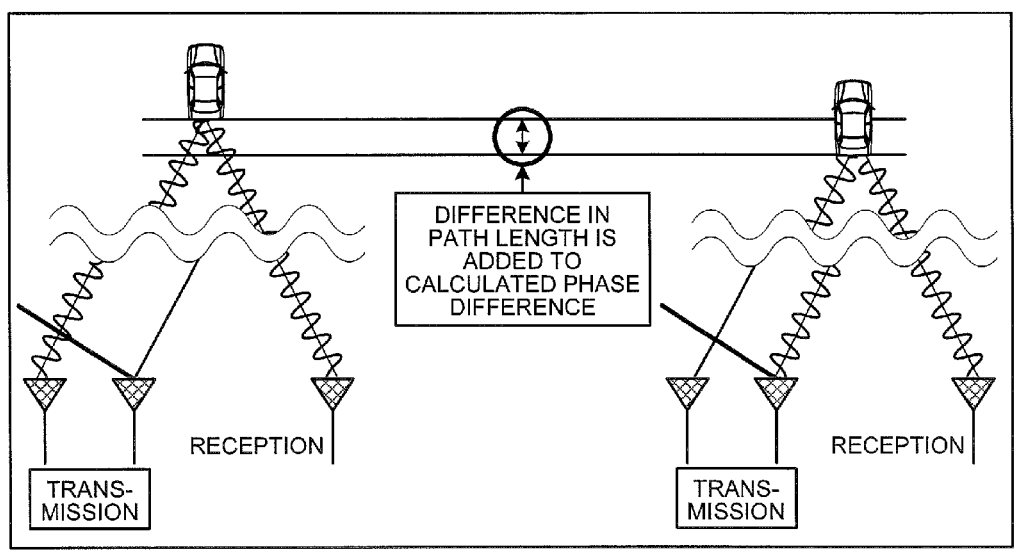
FIG. 8 is a diagram describing the reason why an angle is shifted due to a transmitting time lag.

However, as illustrated in FIG. 8, in the method of performing transmission by sequentially changing over the transmission antennas, the path length difference corresponding to a distance by which the target has moved is added to the path length difference in the receiving antenna itself for each time period during which each transmission antenna is selected, so that the phase difference cannot be appropriately calculated. For example, even when the time lag is "5 ms" at an interval of the antennas being "2.88 lambda," the error of "1 deg" will occur at a relative velocity difference of about "0.06 km/h."

Here, in the in-vehicle radar device 10 of the present embodiment, as for the angle difference of the direct wave and the wave reflected from the ground surface, since the relative velocities are almost the same, the amounts of the phase shift are also the same. For this reason, although the error as an angle is large, the error of the angle difference is comparatively small.

Since the amount of the error of the direct wave and the wave reflected from ground surface is mostly proportional to the relative velocity, an amendment can also be made comparatively easily. For example, the in-vehicle radar device 10 may be provided a table in which the relative velocity and the error of the angle difference are recorded in association with each other in advance. In this case, the in-vehicle radar device 10 reads the value of the error of the angle difference corresponding to the calculated relative velocity from the table, and amends the angle difference of the direct wave and the wave reflected from the ground surface by using the value of the error of the angle difference which is read.

Figure 9A:
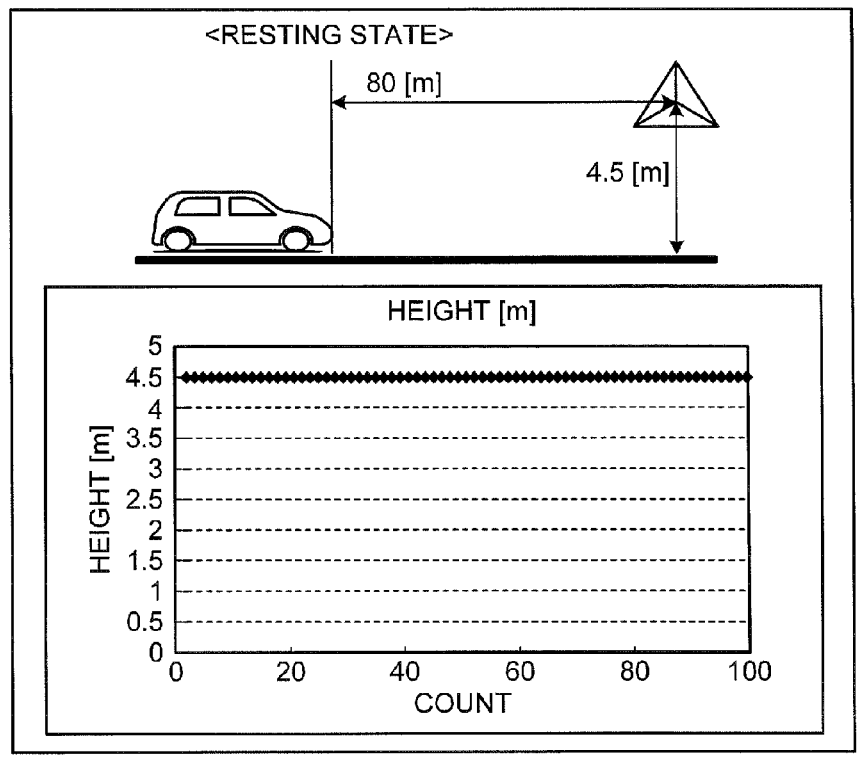
FIGS. 9A and 9B are diagrams illustrating examples of calculation results of the target height in a resting state and an approaching state.
Figure 9B:
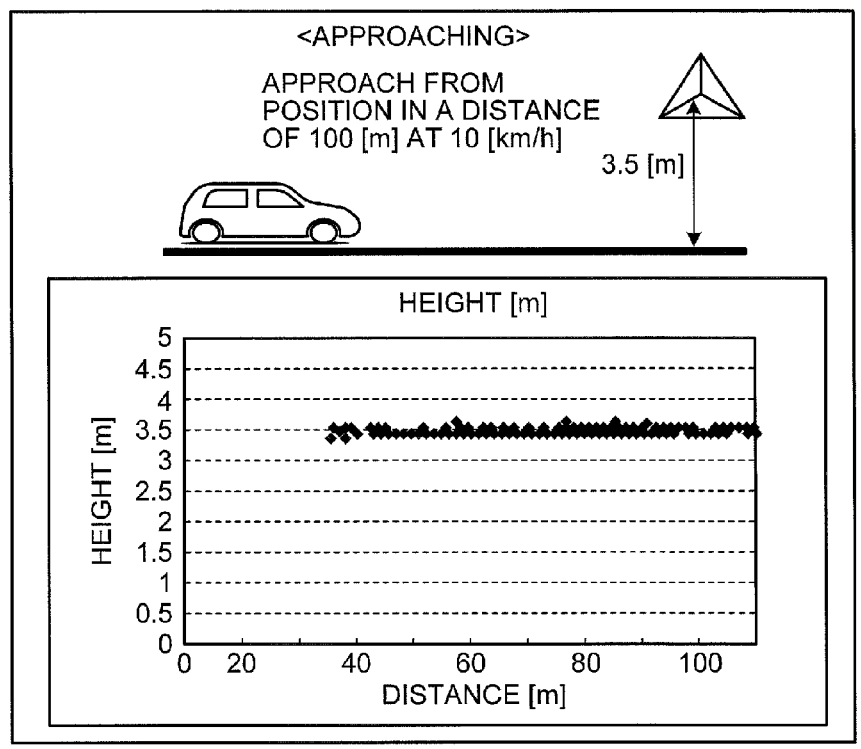

Next, the results of the calculation of the target height in a resting state and an approaching state are described with reference to FIGS. 9A and 9B. FIGS. 9A and 9B are diagrams illustrating the results of the calculation of the target height in a resting state and an approaching state. For example, FIG. 9A describes a case where the distance between a vehicle and a target is "80 m", the target height is "4.5 m", and the vehicle is in the resting state. In this case, as illustrated in the calculation results of FIG. 9A, the in-vehicle radar device 10 performs the target height calculation process 100 times (here, the count on a lateral axis in FIG. 9A represents the number of calculations), and calculates about 4.5 m for all the target height calculation processes. That is, the in-vehicle radar device 10 can calculate the target height with sufficient accuracy.

The example of FIG. 9B shows a case where a vehicle approaches the target at a speed of "10 Km/h" from a point distanced by "100 m" from the target. As illustrated in the calculation results of FIG. 9B, the target height calculation process is repeated until the vehicle approaches a point, which is distanced by about "20 m" from the target, from the point, which is distanced by "100 m" from the target, but the calculation results of all of the target height calculation processes indicate about 3.5 m. That is, since the height of the target can be calculated from the phase difference among the transmission antennas 11a to 11d with sufficient accuracy regardless of presence and absence of relative velocity of the targets, it is possible to identify whether the target is an upper-height object such as a sign board or a lower-height object such as a fallen object.

Next, processing performed by the in-vehicle radar device 10 is described with reference to FIGS. 10 and 11. FIG. 10 is a flowchart illustrating the whole processing procedure in an in-vehicle radar device. FIG. 11 is a flowchart illustrating a processing procedure of a height calculation process performed by the in-vehicle radar device.

As illustrated in FIG. 10, the Fourier-transformation unit 18a of the in-vehicle radar device 10 performs first Fourier-transform with respect to the digital signal converted by the A/D converter 24 (Step S101). Specifically, the Fourier-transformation unit 18a decomposes the reception signal into signal components for every frequency by performing Fast Fourier Transform with respect to the digital signal, and the peak extraction unit 18b detects a peak frequency.

Next, the horizontal azimuth operation unit 18c calculates the horizontal azimuth which is an azimuth of a target in a horizontal direction parallel to the ground surface using an existing angle estimation method (Step S102). Then, the distance-and-relative-velocity operation unit 18d calculates a distance to the target and relative velocity (Step S103). Since the calculation process of calculating the distance to the target, and/or the relative velocity uses a known technology, a detailed description about this is not given here.

And the target height calculation unit 18e performs a height calculation process (which is described in full detail below with reference to FIG. 11) of calculating the height of the target from the ground surface (Step S104). Subsequently, when the height of the target from the ground surface has been calculated, the target height calculation unit 18e transmits information about the target, such as the height of the target from the ground surface, to the external ECU for vehicle control as target information (Step S105), and ends the process.

Next, the height calculation process performed by the in-vehicle radar device 10 is described with reference to FIG. 11. As illustrated in FIG. 11, the vertical azimuth calculation unit 181 of the in-vehicle radar device 10 calculates an azimuth of a real image which exists above the ground and an azimuth of a virtual image which exists underground. Specifically, the vertical azimuth calculation unit 181 calculates the azimuth of a real image above the ground, from reflected waves (direct reflected waves) generated when transmission waves transmitted from the transmission antennas 11a to 11d are reflected from the target. The vertical azimuth calculation unit 181 calculates an azimuth of the virtual image which exists underground from reflected waves (reflected waves from ground surface) generated as the transmission waves transmitted from the transmission antennas 11a to 11d are reflected from the target and then reflected again from the ground surface (Step S201).

Next, the angle difference calculation unit 182 calculates an angle difference of a real image vertical azimuth and a virtual image vertical azimuth which are calculated by the vertical azimuth calculation unit 181 (Step S202). Specifically, the angle difference calculation unit 182 calculates angles of the target and the virtual image and calculates a difference between the angles as an angle difference.

And the acquiring unit 183 acquires the distance from the in-vehicle radar device 10 to the target which is calculated by the distance-and-relative-velocity operation unit 18d (Step S203). Then, the acquiring unit 183 acquires a radar mounting height which is a height of the in-vehicle radar device 10 from the ground surface which is set in advance (Step S204).

Then, the height calculation unit 184 calculates the height of the target from the ground surface using the angle difference calculated by the angle difference calculation unit 182 (Step S205). Specifically, the height calculation unit 184 calculates the height of the target from the ground surface from Formula (1) by using the distance from the in-vehicle radar device 10 to the target which is acquired by the acquiring unit 183, the radar mounting height, and the angle difference calculated by the angle difference calculation unit 182.

As described above, in the in-vehicle radar device 10 according to a first embodiment, as the vertical azimuth which is an azimuth of the target in the vertical direction perpendicular to the ground surface, an azimuth of a real image which exists over the ground is calculated from the reflected waves generated when the transmission waves transmitted from the transmission antennas 11*a* to 11*d* are reflected from the target, and an azimuth of a virtual image which exists underground is calculated from the reflected wave generated when the transmission waves transmitted from the transmission antennas 11*a* to 11*d* are reflected from the target, and then reflected again from the ground surface. And in the in-vehicle radar device 10, the angle difference of the azimuth of the real image and the azimuth of the virtual image which were calculated is calculated, and the height of the target from the ground surface is calculated using the calculated angle difference. By this, in the in-vehicle radar device 10 according to the first embodiment, since the height of the target from the ground surface can be calculated, whether the target is either a signboard on a roadway installed above the ground surface or a fallen object which remains fallen on the roadway, or the target is a vehicle or the like running in front of the vehicle can be determined. That is, only target in front of the vehicle can be appropriately recognized without a false detection of a signboard or a fallen object on road.

In the in-vehicle radar device 10 according to the first embodiment, the transmission antenna includes a plurality of transmission antennas 11*a* to 11*d*, and the transmission antennas 11*a* to 11*d* are arranged in positions which are shifted in the vertical direction. For this reason, in the in-vehicle radar device 10, the real image vertical azimuth which is a vertical azimuth of the transmission wave with respect to the target, and the virtual image vertical azimuth which is a vertical azimuth of the reflected wave, which are generated when the transmission wave is reflected from the ground surface, with respect to the target can be appropriately calculated.

In the in-vehicle radar device 10 according to the first embodiment, any one of the transmission antennas 11*a* to 11*d*, among the plurality of transmission antennas 11*a* to 11*d*, transmit a transmission wave one after another. In the in-vehicle radar device 10, since the height of the target from the ground surface is calculated using the angle difference of the real image vertical azimuth and the virtual image vertical azimuth, even when a target with relative velocity is detected using the method of performing transmission by sequentially changing over the transmission antennas, the influence of a transmission time lag attributable to the switching among the transmission antennas can be suppressed.

Now, although the embodiment of the present invention has been described so far, the present invention may be implemented in various different forms besides the above embodiment. Therefore, different embodiments which are categorized into (1) determination about an axis shift of a vertical axis of a radar, (2) the number of antennas, (3) a radar, (4) mounting to a vehicle, (5) the configuration of a system, etc. are described below.

In the above embodiment, a case where angles of a real image vertical azimuth and a virtual image vertical azimuth are calculated, and then the height of a target from the ground surface is calculated is described. Alternatively, the angles of the real image vertical azimuth and the virtual image vertical azimuth are calculated, and an amount of a shift of a vertical axis (vertical axis shift amount) of the radar may be estimated.

Figure 12:
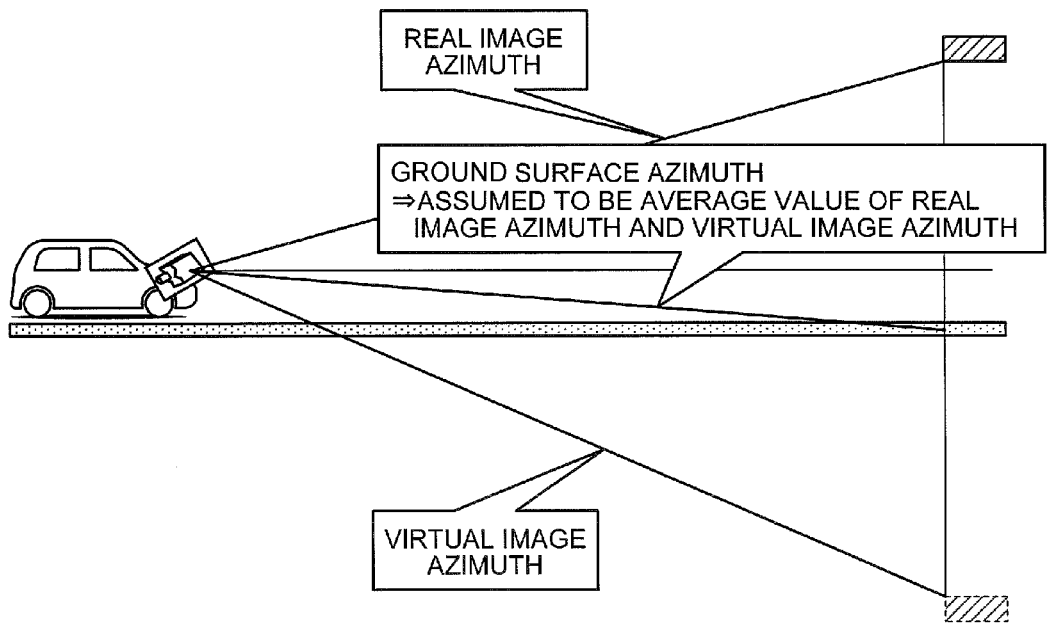
FIG. 12 is a diagram describing the outline of a vertical axis calculation method.

Here, the outline of a calculation method of calculating the vertical axis shift amount is described with reference to FIG. 12. FIG. 12 is a diagram describing the outline of a vertical axis calculation method. As illustrated in FIG. 12, an in-vehicle radar device sets an average value of a real image azimuth and a virtual image azimuth as a ground surface azimuth. And the in-vehicle radar device estimates the vertical axis shift amount from an error between the average value of the real image azimuth and the virtual image azimuth, and a ground surface true value azimuth. In a technique of estimating the vertical axis shift amount on the assumption that the average value of the real image azimuth and the virtual image azimuth is set to the ground surface azimuth, when a radar mounting height or a height of a target is high, or when a distance of the target is short, an error of the vertical axis shift amount is increased. For this reason, the method of more precisely estimating the vertical axis shift amount is described in full detail below.

Figure 13:
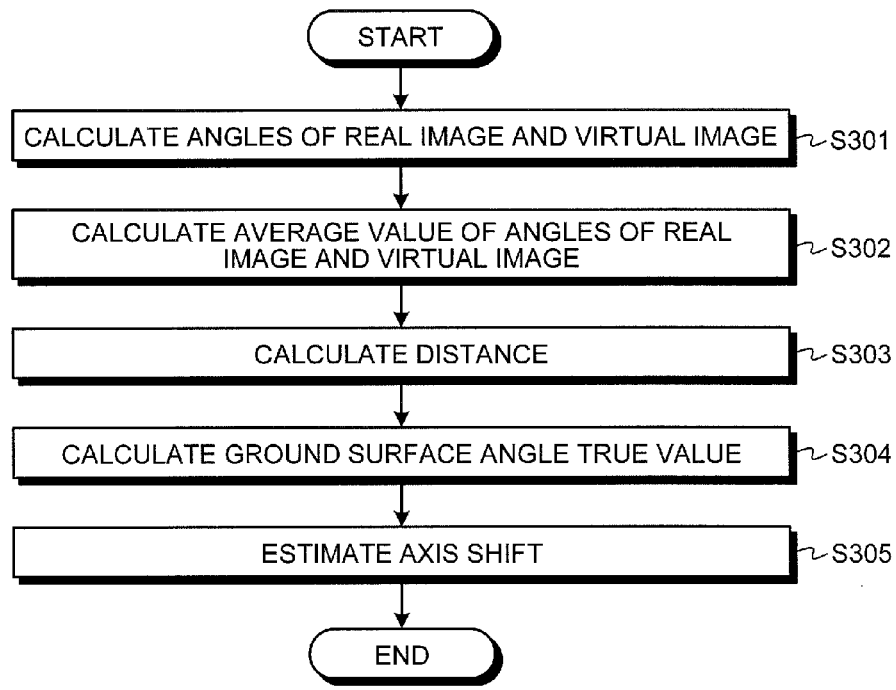
FIG. 13 is a flowchart illustrating the processing procedure of a vertical axis calculation process performed by the in-vehicle radar device.

First, a processing procedure of estimating the vertical axis shift amount on the assumption that the average value of the real image azimuth and the virtual image azimuth is set to the ground surface azimuth is described with reference to FIG. 13. FIG. 13 is a flowchart illustrating a processing procedure of a vertical axis shift amount calculation process performed by an in-vehicle radar device. As illustrated in FIG. 13, the in-vehicle radar device calculates angles of a real image angle and a virtual image (Step S301). Next, the in-vehicle radar device calculates an average value of the angles of the real image and the virtual image (Step S302).

Figure 14:
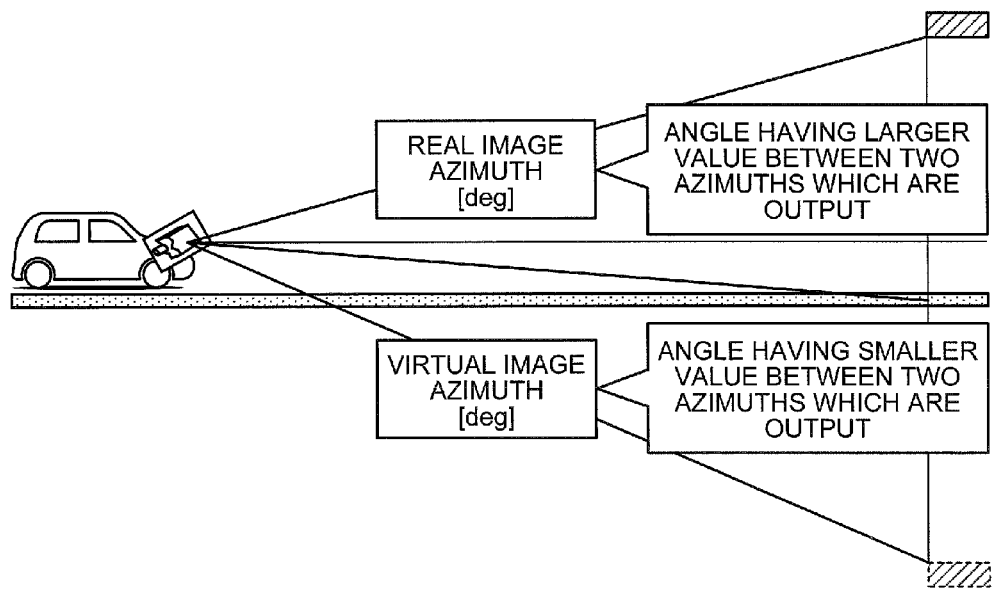
FIG. 14 is a diagram describing a calculation process of calculating angles of a real image and a virtual image, and a process of calculating an average value of the angles of the real image and the virtual image.

Here, a calculation process of calculating the angles of the real image and the virtual image and a process of calculating the average value of the angles of the real image and the virtual image are described with reference to FIG. 14. FIG. 14 is a diagram describing the calculation process of calculating the angles of the real image and the virtual image and the process of calculating the average value of the angles of the real image and the virtual image. As illustrated in FIG. 14, an angle (real image azimuth [deg]) with respect to the azimuth of a real image which exists over the ground, and an angle (virtual image azimuth [deg]) with respect to the azimuth of the virtual image which exists underground are calculated. Next, the in-vehicle radar device calculates an angle average value [deg] which is an average of the real image azimuth [deg] and the virtual image azimuth [deg] using the following Formula (8).

$$\text{Angle average value}[deg] = \frac{\text{Real image azimuth}[deg] + \text{Virtual image azimuth}[deg]}{2} \quad (8)$$

Next, the in-vehicle radar device calculates a distance from the in-vehicle radar device to the target (Step S303).

Next, the in-vehicle radar device calculates the ground surface angle true value using the radar mounting height and the distance from the in-vehicle radar device to the target (Step S304).

Figure 15:
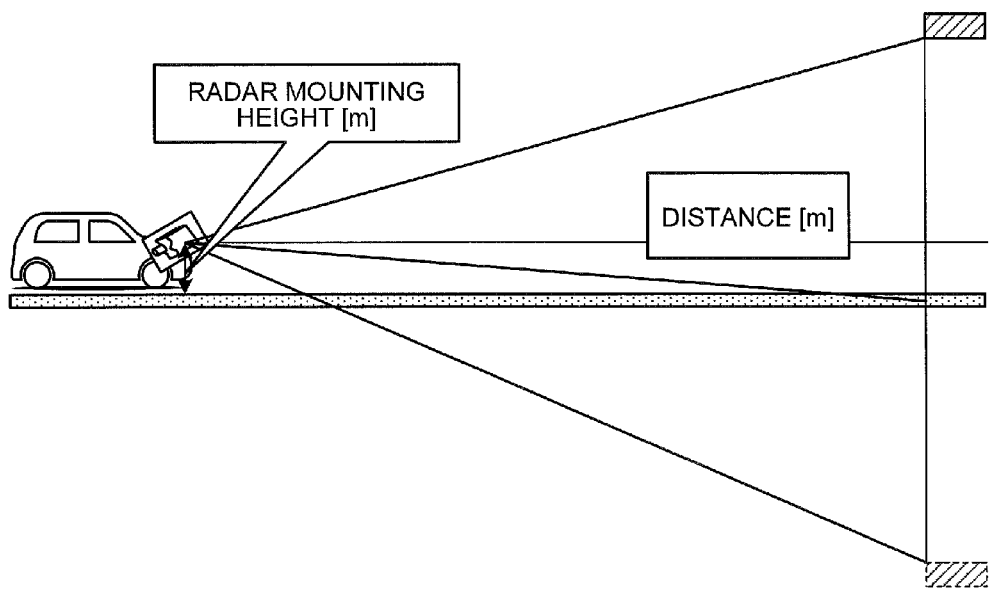
FIG. 15 is a diagram describing a process of calculating a ground surface angle true value.

Here, a process of calculating the ground surface angle true value is described with reference to FIG. 15. FIG. 15 is a diagram describing the process of calculating the ground surface angle true value. As illustrated in FIG. 15, the in-vehicle radar device acquires the distance (distance [m]) from the in-vehicle radar device to the target, and the mounting height of a radar (radar mounting height [m]) which is preset, and calculates the ground surface angle true value (ground surface azimuth [deg]) which is an angle of the ground surface azimuth using the following Formula (9).

$$\text{Ground surface azimuth}[deg] = \tan^{-1}\left(\frac{-\text{Radar mounting height}[m]}{\text{Distance}[m]}\right) \quad (9)$$

Subsequently, the in-vehicle radar device estimates an axis shift amount using the angle average value and the ground surface angle true value (Step S305). Specifically, the in-vehicle radar device estimates the angle shift amount by calculating "axis shift estimate [deg]=−angle average value [deg]+ground surface azimuth [deg]."

Thus, although the method of estimating the axis shift amount has been described assuming that the average value of the real image azimuth and the virtual image azimuth is the ground surface azimuth in the above description, a technique of more precisely estimating the axial shaft amount than the above-described axis shift amount estimation process is described below.

Figure 16:
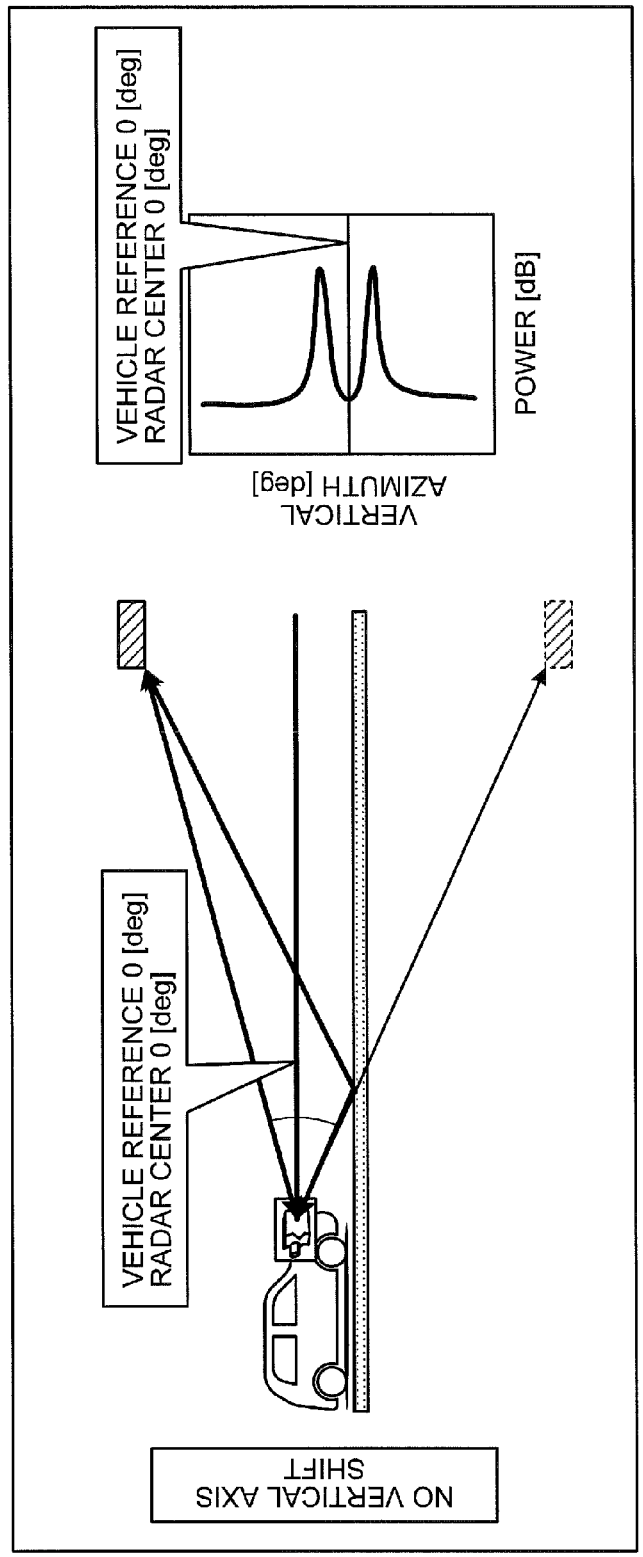
FIG. 16 is a diagram illustrating an example of a behavior of a spectrum for an angle estimation when there is no vertical axis shift.
Figure 17:
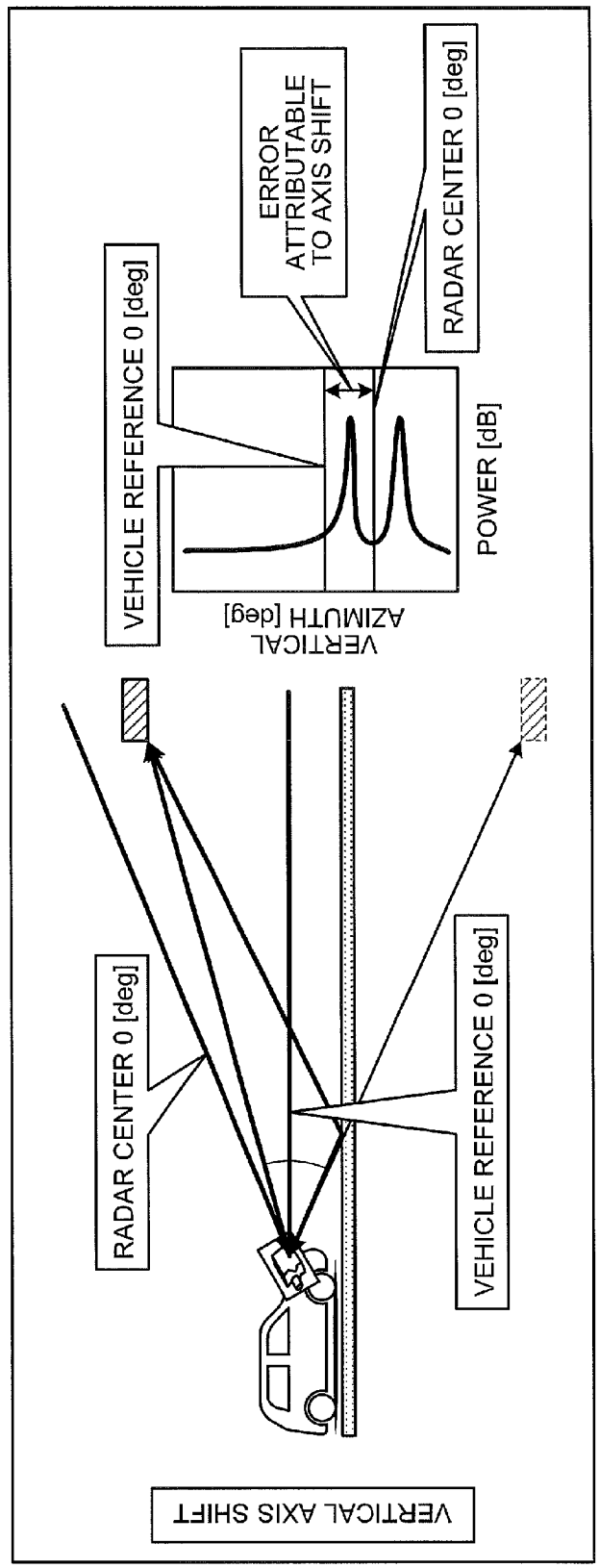
FIG. 17 is a diagram illustrating an example of a behavior of a spectrum for an angle estimation when there is a vertical axis shift.

First, differences in behavior of angle spectrums between a case where there is no axis shift and a case where there is an axis shift are described with reference to FIGS. 16 and 17. FIG. 16 is a diagram illustrating an example of the behavior of an angle spectrum in a case where there is no vertical axis shift. FIG. 17 is a diagram illustrating an example of the behavior of an angle spectrum in a case where there is a vertical axis shift. When there is no vertical axis shift, as illustrated in FIG. 16, a radar center, 0 [deg], which is an angle of the vertical azimuth set as a central direction of the radar is in agreement with a vehicle reference, 0 [deg], which is an angle of the vertical azimuth when the vehicle is a reference. On the other hand, when there is the vertical axis shift, as illustrated in FIG. 17, a shift occurs between the vehicle reference 0 [deg] and the radar center [deg]. In addition, when the spectrum illustrated in FIG. 17 and the spectrum illustrated in FIG. 16 are compared, the behaviors of the spectrums are different from each other. In the spectrum illustrated in FIG. 17, an error attributable to the axis shift occurs. Thus, mainly focusing on the difference in the behavior of the angle spectrum between the case where there is no vertical axis shift and the case where there is a vertical axis shift, a technique of estimating the axis shift amount is described below.

Figure 18:
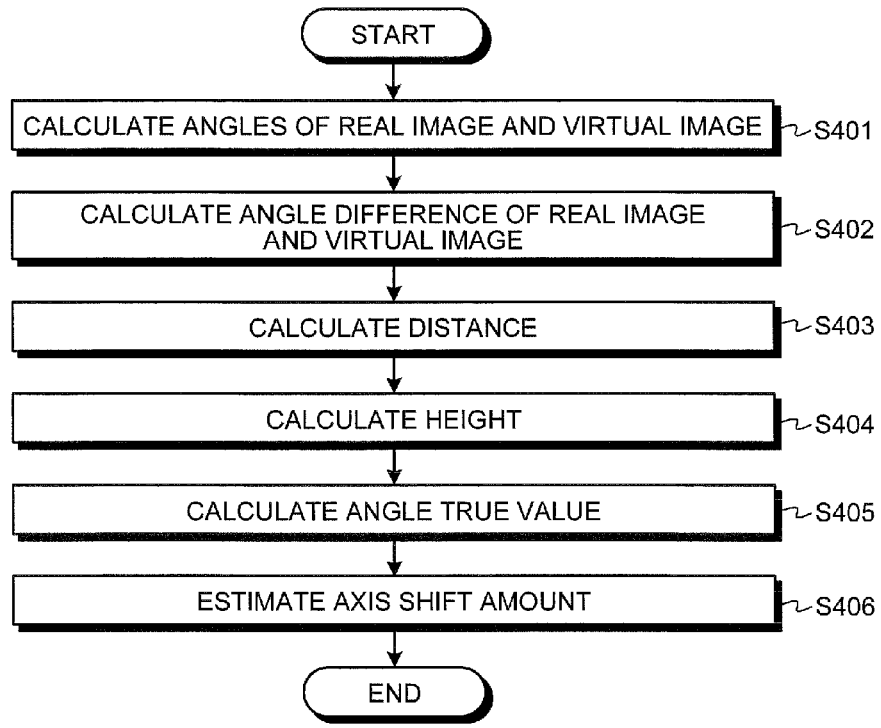
FIG. 18 is a flowchart illustrating the processing procedure of a vertical axis calculation process performed by the in-vehicle radar device.

The processing procedure of estimating the axis shift amount is described with reference to FIG. 18. FIG. 18 is a flowchart illustrating the processing procedure of a vertical axis shift amount calculation process performed by the in-vehicle radar device. As illustrated in FIG. 18, the in-vehicle radar device calculates angles of a real image and a virtual image (Step S401). Next, the in-vehicle radar device calculates an angle difference of the real image and the virtual image (Step S402).

Figure 19:
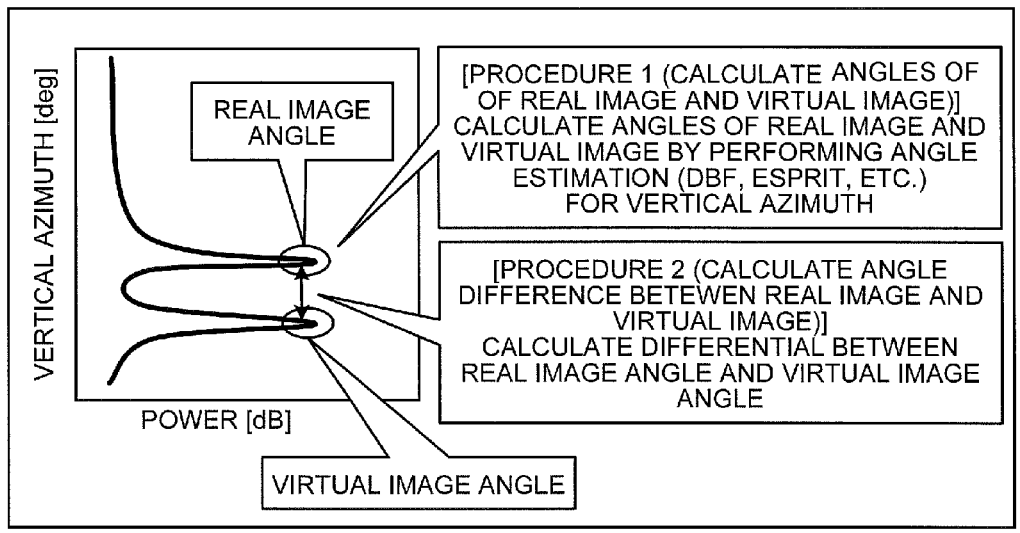
FIG. 19 is a diagram illustrating an example of a spectrum as a result of an operation of a vertical azimuth.

Here, a calculation process of calculating the angles of the real image and the virtual image and a process of calculating the angle difference of the real image and the virtual image are described with reference to FIG. 19. FIG. 19 is a diagram illustrating an example of the spectrum as a result of a vertical azimuth operation. As illustrated in FIG. 19, the in-vehicle radar device calculates angles of a real image and a virtual image by carrying out angle estimation (DBF, ESPRIT, etc.) of a vertical azimuth (Procedure 1). Next, the in-vehicle radar device subtracts the angle [deg] of the virtual image from the angle [deg] of the real image, thus calculating an angle difference between the angles of the real image and the virtual image which is a differential between the angle [deg] of the real image and the angle [deg] of the virtual image (Procedure 2).

Subsequently, the in-vehicle radar device calculates a distance from the in-vehicle radar device to the target (Step S403). Next, the in-vehicle radar device calculates a height of the target from the ground surface (Step S404). Next, the in-vehicle radar device calculates angle true values of the real image and the virtual image from the distance and the height (Step S405).

Figure 20:
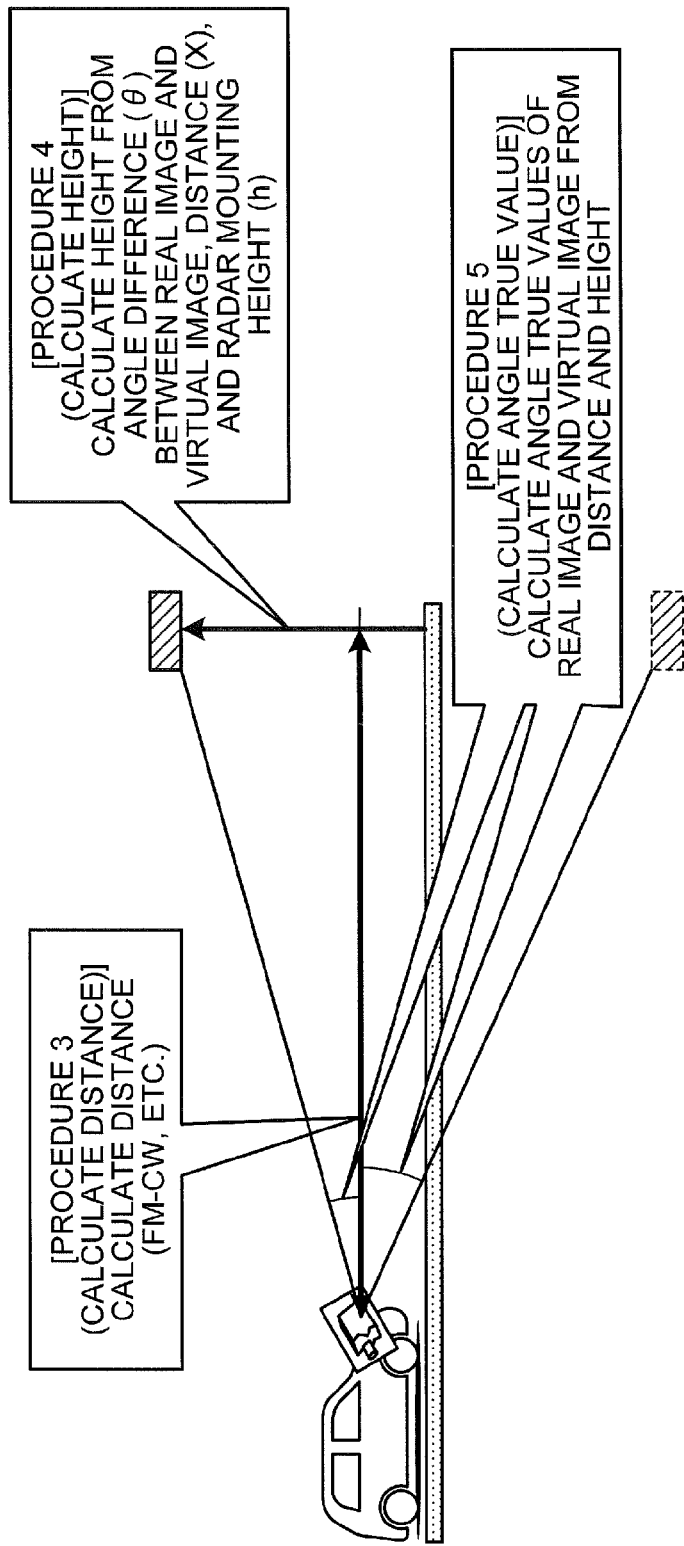
FIG. 20 is a diagram describing a calculation process of calculating a distance, a calculation process of calculating a height, and a calculation process of calculating an angle true value.

Here, a calculation process of calculating the distance, a calculation process of calculating the height, and a calculation process of calculating the angle true values are described with reference to FIG. 20. FIG. 20 is a diagram describing the calculation process of calculating the distance, the calculation process of calculating the height, and the calculation process of calculating the angle true values. As illustrated in FIG. 20, the in-vehicle radar device is a radar using FM-CW etc. and calculates the distance to a target using an existing technology (Procedure 3). Next, the in-vehicle radar device calculates the height of the target from the ground surface by the following Formula (10), using the angle difference "θ" of the real image and the virtual image, the distance "X" to the target, and the radar mounting height "h" (Procedure 4).

$$\text{Height}[m] = -\frac{X}{\tan\theta} + \sqrt{\frac{X^2}{(\tan\theta)^2} + h^2 + X^2} \quad (10)$$

Next, the in-vehicle radar device calculates a real image true value [deg] by the following Formula (11), using the distance [m] to the target, the radar mounting height [m], and the height [m] of the target from the ground surface (Procedure 5) (refer to Formula (3)). In addition, the in-vehicle radar device calculates a virtual image true value [deg] by the following Formula (12), using the distance [m] to the target, the radar mounting height [m], and the height [m} of the target from the ground surface (Procedure 5) (refer to Formula (4)).

$$\text{Real image true value}[deg] = \tan^{-1}\left(\frac{\text{Height}[m] - \text{Radar mounting height}[m]}{\text{Distance}[m]}\right) \quad (11)$$

$$\text{Virtual image true value}[deg] = \tan^{-1}\left(\frac{-(\text{Height}[m] + \text{Radar mounting height}[m])}{\text{Distance}[m]}\right) \quad (12)$$

Figure 21:
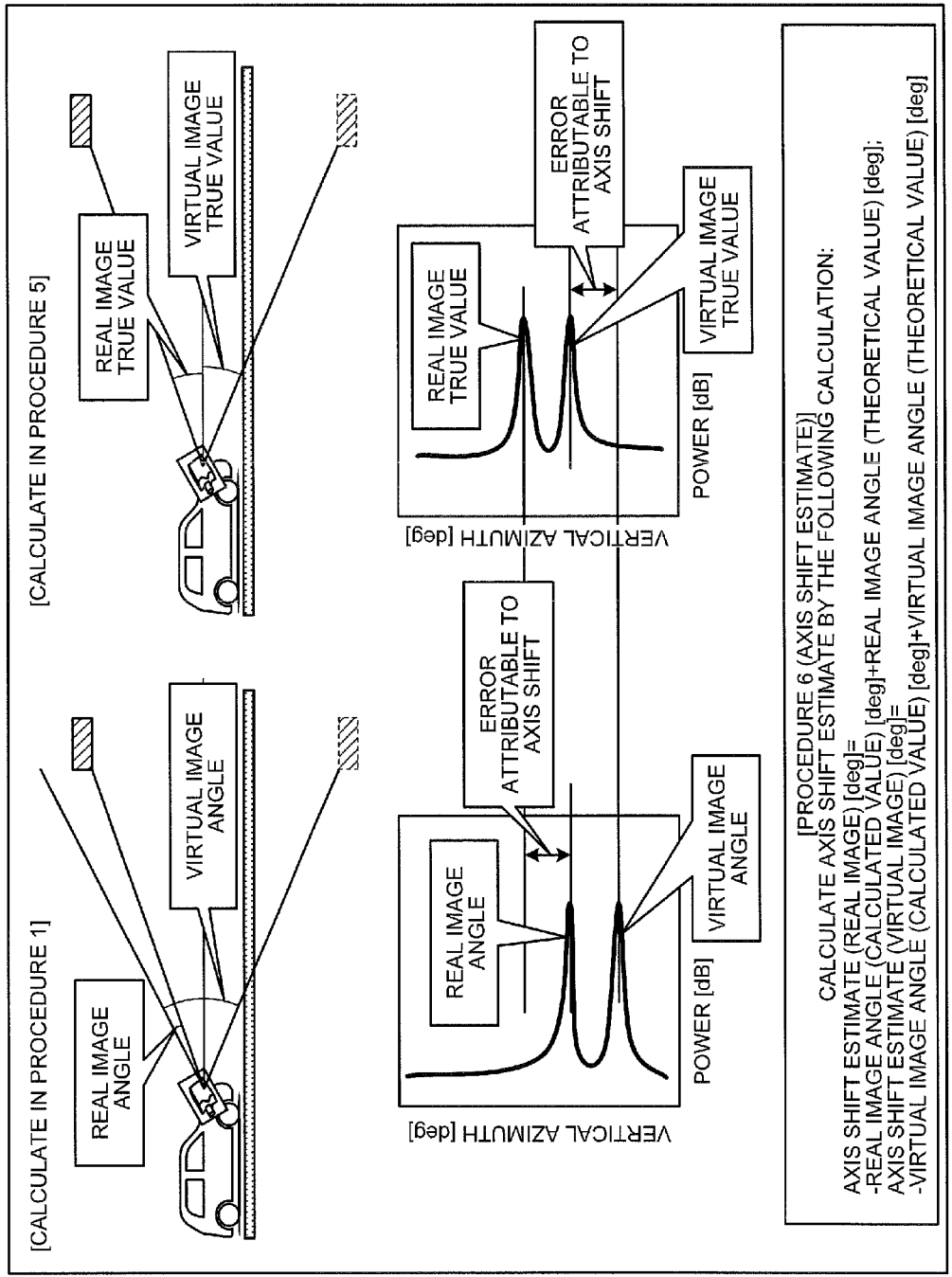
FIG. 21 is a diagram describing an estimation process of estimating an axis shift amount.
Figure 22A:
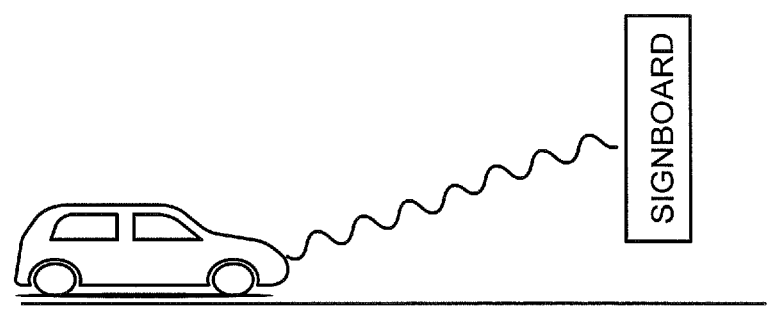
FIGS. 22A and 22B are diagrams illustrating examples in which a signboard or a fallen object is falsely recognized as a front target.
Figure 22B:
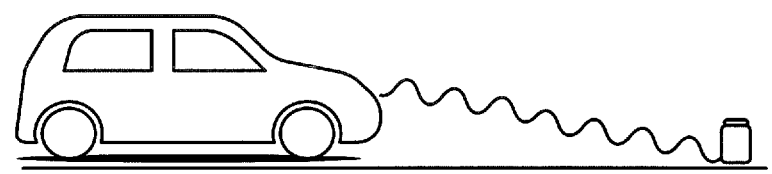

Next, the in-vehicle radar device estimates the axis shift amount (Step S406). Here, an estimation process of estimating the axis shift amount is described with reference to FIG. 21. FIG. 21 is a diagram describing the estimation process of estimating the axis shift amount. As illustrated in FIG. 21, the angles of the real image and virtual image which are calculated in Procedure 1 are compared with the real image true value and virtual image true value which are calculated in Procedure 5. As a result of the comparison, a differential between the angle of the real image and the real image true value and a differential between the angle of the virtual image and the virtual image true value are assumed to be errors.

Specifically, the in-vehicle radar device calculates the axis shift estimate (real image) [deg] by computing "axis shift estimate (real image) [deg]=−real image angle (calculated value) [deg]+real image angle (theoretical value) [deg]" (Procedure 6). The in-vehicle radar device calculates the axis shift estimate (virtual image) [deg] by computing "axis shift estimate (virtual image) [deg]=−virtual image angle (calculated value) [deg]+virtual image angle (theoretical value) [deg]" (Procedure 6). Here, although the axis shift estimate (real image) [deg] calculated from the real image and the axis shift estimate (virtual image) [deg] calculated from the virtual image are theoretically in agreement, an error is expected to actually occur. When such an error occurs, the axis shift estimate is calculated by performing, for example, a process of taking an average value of the axis shift estimate (real image) [deg] and the axis shift estimate (virtual image) [deg], etc.

Thus, since the in-vehicle radar device can calculate the axis shift estimate, it is possible to adjust a mounting angle of the in-vehicle radar device based on the axis shift estimate, to prevent the axis shift of the vertical axis of the in-vehicle radar device, and to appropriately calculate the target height.

Although a case where there are four transmission antennas and four receiving antennas is described in the above-described embodiment, the present invention is not limited to thereto. That is, there may be three or more transmission antennas and two or more receiving antennas.

Although a millimeter wave is considered as a beam received and transmitted by the antennas in the above-described embodiment, the present invention is not limited thereto. For example, the present invention is similarly applicable to a radio wave, a light wave, an ultrasonic wave, etc. like the millimeter wave.

Although the in-vehicle radar device which is mounted to a front portion of a vehicle and a scan region is set in front of a vehicle is considered in the above-described embodiment, the present invention is not limited thereto. For example, the present invention can be similarly applied to the in-vehicle radar device where the scan region is set in the rear of a vehicle, a front side portion of a vehicle, surroundings of a vehicle, etc., and the present embodiment is not limited by the scan region.

Among the processes described in the present embodiment, all or a part of the processes which are described to be automatically performed may be manually performed, or all or a part of the process which are described to be manually performed may be automatically performed. In addition, a processing procedure, a control procedure, specific names, information including various kinds of data and parameters which are described in the specification and illustrated in the drawings can be arbitrarily changed unless otherwise specifically stated.

Moreover, each component of each device illustrated is a conceptually functional component, and it does not necessarily constituted in the physically same way as illustrated. That is, the concrete form of distribution and integration of each device is not restricted to illustrated ones, but all of the parts or a part may be functionally or physically distributed or integrated in arbitrary units according to various kinds of loads, use conditions, etc. As for each process function performed by each device, the whole process function or a certain partial process function can be implemented by a CPU and a program which is analyzed and executed by the CPU, or can be implemented by hardware configured by a wired logic.

The target height calculation method described in the present embodiment can be implemented by causing a computer such as a personal computer or a workstation to execute a preliminarily prepared program. This program can be distributed via networks, such as the Internet. This program is recorded in a computer-readable recording medium, such as hard disk, flexible disk (FD), CD-ROM, MO, and DVD, and can be executed by causing a computer to read the program from the recording medium.

The present invention has an advantage of appropriately recognizing only a front target, without a false detection of a signboard or a fallen object on a roadway.

As described above, a radar device and a target height calculation method according to the present invention are useful for appropriately detecting a front target, and it is especially suitable for calculating the height of a target from the ground surface.

Further effects and modifications can be easily drawn by a person skilled in the art. The embodiments of the present invention are provided for illustrative purposes and the present invention is not limited to a specific embodiment described above. Therefore, various changes are possible without departing from the scope of the invention described in the claims and equivalents thereof.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A radar device comprising:
a vertical azimuth calculation unit which calculates, as a vertical azimuth which is an azimuth of a target in a direction perpendicular to a ground surface, an azimuth of a real image existing above ground from a reflected wave generated when a transmission signal transmitted from a transmission antenna is reflected from the target, and an azimuth of a virtual image imaginarily existing underground using a reflected wave generated when the transmission signal transmitted from the transmission antenna is reflected from the target and reflected again from the ground surface;
an angle difference calculation unit which calculates an angle difference between the azimuth of the real image and the azimuth of the virtual image which are calculated by the vertical azimuth calculation unit; and
a height calculation unit which calculates a height of the target from the ground surface, using the angle difference calculated by the angle difference calculation unit.

2. The radar device according to claim 1, wherein the transmission antenna includes a plurality of transmission antennas which are arranged in positions shifted from each other in the vertical direction.

3. The radar device according to claim 2, wherein some transmission antennas among the plurality of transmission antennas sequentially transmit the transmission wave.

4. The radar device according to claim 1, further comprising:
a ground surface position calculation unit which calculates a position of the ground surface from the azimuth of the real image and the azimuth of the virtual image which are calculated by the vertical azimuth calculation unit; a comparing unit which compares a position of the ground surface calculated by the ground surface position calculation unit with a real position of the ground surface; and an adjuster which adjusts a mounting angle of the radar device so that the position of the ground surface calculated by the ground surface position calculation unit and the real position of the ground surface become in agreement, as a result of comparison by the comparing unit.

5. A target height calculation method comprising:

calculating, by a processor, as a vertical azimuth which is an azimuth of a target in a direction perpendicular to a ground surface, an azimuth of a real image existing above ground from a reflected wave generated when a transmission signal transmitted from a transmission antenna is reflected from the target, and an azimuth of a virtual image imaginarily existing underground from a reflected wave generated when the transmission signal transmitted from the transmission antenna is reflected from the target and reflected again from the ground surface;

calculating, by the processor, an angle difference between the calculated azimuth of the real image and the calculated azimuth of the virtual image; and calculating, by the processor, a height of the target from the ground surface, using the calculated angle difference.

* * * * *